United States Patent
Yamaguchi et al.

(10) Patent No.: US 8,556,763 B2
(45) Date of Patent: Oct. 15, 2013

(54) VEHICLE FINAL REDUCTION GEAR UNIT

(75) Inventors: Masahiro Yamaguchi, Saitama (JP); Bunzo Seki, Saitama (JP); Makoto Toda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 279 days.

(21) Appl. No.: 13/050,621

(22) Filed: Mar. 17, 2011

(65) Prior Publication Data

US 2011/0230301 A1  Sep. 22, 2011

(30) Foreign Application Priority Data

Mar. 19, 2010 (JP) ................................ 2010-064456

(51) Int. Cl.
| | |
|---|---|
| *F16H 48/20* | (2012.01) |
| *B60W 10/02* | (2006.01) |
| *B60W 10/18* | (2012.01) |
| *F16D 13/76* | (2006.01) |
| *F16D 67/02* | (2006.01) |

(52) U.S. Cl.
USPC ............. 475/224; 475/231; 192/13 A; 192/16

(58) Field of Classification Search
USPC ........... 475/224, 231; 192/13 R, 13 A, 14, 16
See application file for complete search history.

(56) References Cited

U.S. PATENT DOCUMENTS 6,837,817 B2 * 1/2005 Mori et al. .................... 475/142

FOREIGN PATENT DOCUMENTS

JP  2000-052943 A  2/2000

* cited by examiner

*Primary Examiner* — Tisha Lewis
(74) *Attorney, Agent, or Firm* — Birch, Stewart, Kolasch & Birch, LLP

(57) ABSTRACT

A vehicle final reduction gear unit includes a first friction brake positioned between a right case member which is a stationary body and a differential case which is a rotating body for applying a pressing force in an axial direction to generate a frictional force in order to put a brake on the differential case. A second friction brake occupies an area between the differential case and the right wheel and applies a pressing force in the axial direction to generate a frictional force in order to use a rotational difference to put the differential mechanism into a lock state. The second friction brake is placed within the radius of the first friction brake. A reduced size is accomplished and the final reduction gear unit can be reduced in length in the vehicle-transverse direction. Thus, a vehicle final reduction gear unit allowing a reduction in size can be provided.

18 Claims, 12 Drawing Sheets

VEHICLE FINAL REDUCTION GEAR UNIT

CROSS-REFERENCE TO RELATED APPLICATIONS

The present application claims priority under 35 USC 119 to Japanese Patent Application No. 2010-064456 filed on Mar. 19, 2010 the entire contents of which are hereby incorporated by reference.

BACKGROUND OF THE INVENTION

1. Field of the Invention

This invention relates to an improvement in a vehicle final reduction gear unit equipped with friction brake for braking a vehicle.

2. Description of Background Art

A final reduction gear unit of an ATV (All Terrain Vehicle) equipped with a differential mechanism and multi-disc wet brake is disclosed, for example, in JP-A No. 2000-52943 (FIG. 2, FIG. 3).

As shown in FIG. 2 in JP-A No. 2000-52943, in an ATV, a prime mover (8) (a parenthesized number indicates a reference sign described in JP-A No. 2000-52943, the same shall apply hereinafter) is disposed in the center of the vehicle. The drive force generated by the prime mover (8) is transmitted through a drive shaft (12) to a differential mechanism (17). The drive force transmitted to the differential mechanism (17) is then transmitted to the right and left axles (20) to rotate the front wheels (1).

Further, as shown in FIG. 3 in JP-A No. 2000-52943, the differential mechanism (17) is housed in a differential case (18) which is a rotating body. The differential case (18) is housed in a reduction gear case (14) which is a stationary body. The drive force transmitted to the drive shaft (12) is transmitted from a small reduction gear (15) coupled to the drive shaft (12), to a large reduction gear (16) provided integrally with the differential case (18), thus rotating the differential case (18) and also the right and left axles (20).

The differential mechanism (17) includes a support shaft (32) secured to the differential case (18) at right angles to the axle (20), a plurality of small differential gears (31) rotatably mounted on the support shaft (32), and right and left large differential gears (30) meshing with the small differential gears (31) and respectively rotating integrally with the right and left axles (20). The rpm of the right and left axles (20) is appropriately distributed, thus providing a smooth vehicle driving.

The multi-disc wet brake (6) braking the differential case (18) occupies an area between the reduction gear case (14) and the differential case (18). In the multi-disc wet brake (6), a plurality of stationary friction discs (41) are spline-fitted into the inner peripheral surface of the reduction gear case (14) and are able to move in the direction of the axle and are alternated in position with a plurality of rotative friction discs (40) which are spline-fitted into the outer peripheral surface of the differential case (18) and are able to move the direction of the axle. A braking disc (42) is operated to apply a pressing force in the axial direction to generate a frictional force, thus braking the differential case (18).

A friction device (35) includes a plurality of side friction discs (36b) which are spline-fitted into the inner peripheral surface of the differential case (18) and are able to move in the support shaft, a plurality of axle-side friction discs (36a) which are spline-fitted into the left large differential gear (30) and are able to move in the axial direction, and a coned disc spring (37) which press the friction discs (36a, 36b) toward the axial direction. A differential between the right and left axles (20) can be limited to a certain extent by the friction device (35).

It may be desired to lock the differential of an ATV between the right and left axles (20). However, if a diff-lock operation device for locking a differential is mounted on the friction device (35), the installation area of the diff-lock operation device is additionally required, leading to an increased size of the final reduction gear unit. Under these circumstances, a desired final reduction gear unit can be designed to be compact in size even when it is equipped with a diff-lock operation device.

SUMMARY AND OBJECTS OF THE INVENTION

It is an object of an embodiment of the present invention to provide a vehicle final reduction gear unit allowing a reduction in size.

According to an embodiment of the present invention, a vehicle final reduction gear unit has a prime mover generating a drive force, a drive shaft transmitting a drive force from the prime mover, a small reduction gear coupled to the drive shaft and thus rotating, a large reduction gear meshing with the small reduction gear and thus rotating, a differential mechanism transmitting a drive force from the large reduction gear to left and right axles. A differential case houses the differential mechanism. A final-reduction-gear case is provided closer to a vehicle body for housing the small reduction gear, the large reduction gear, the differential mechanism and the differential case. The vehicle final reduction gear unit has a first friction brake that occupies an area between the final-reduction-gear case which is a stationary body and the differential case which is a rotating body and applies a pressing force in an axial direction to generate a frictional force in order to put a brake on the differential case. A second friction brake occupies an area between the differential case and the axle, and applies a pressing force in the axial direction to generate a frictional force in order to use a rotational difference to put the differential mechanism into a lock state. The second friction brake is placed within the radius of the first friction brake.

According to an embodiment of the present invention, the first friction brake comprises a cylinder-shaped first friction brake supporter that is mounted to the differential case and extends from one of left and right ends of the differential case in the vehicle-transverse direction, a plurality of stationary friction discs that are spline-fitted into a cylinder-shaped inner peripheral surface of the final-reduction-gear case and able to move in an axial direction, and a plurality of first rotation friction discs that are spline-fitted into a cylinder-shaped outer peripheral surface of the first friction brake supporter and arranged alternately with the stationary friction discs. The second friction brake comprises a plurality of second rotational friction discs that are spline-fitted into a cylinder-shaped inner peripheral surface of the first friction brake supporter, a collar that is spline-fitted into the axle, and a plurality of axle-side friction discs that are spline-fitted into a cylinder-shaped outer peripheral surface of the collar and arranged alternately with the second rotation friction discs.

According to an embodiment of the present invention, the final-reduction-gear case comprises a cylinder-shaped central case member having left and right opening ends in the vehicle-transverse direction, a left case member placed on the left side of the central case member and having an end wall, and a right case member placed on the right side of the central case member and having an end wall. The central case member is tightly placed between the left and right case members, is integratedly fastened to the left and right case members, and has a brake support wall provided integrally therewith. The brake support wall protrudes inward in the radial direction to receive a pressing force of the first friction brake. The stationary friction discs and the first rotational friction discs are placed between the brake support wall and the end wall, and the brake support wall and the end wall receive the reaction force to the pressing of the brake.

According to an embodiment of the present invention, the second rotation friction discs and the axle-side friction discs are placed between a side wall of the differential case and the end wall with interposition of a thrust bearing, and the side wall and the end wall receive the reaction force to the pressing of the brake.

According to an embodiment of the present invention, a brake operation device for braking the vehicle is activated by the first friction brake and the second friction brake. A diff-lock operation device for putting the differential mechanism into a lock state is activated by the second friction brake alone.

According to an embodiment of the present invention, slip torque of the second friction brake is set to half the braking force of the first friction brake.

According to an embodiment of the present invention, the vehicle final reduction gear unit has a first friction brake that occupies an area between the final-reduction-gear case which is a stationary body and the differential case which is a rotating body and applies a pressing force in an axial direction to generate a frictional force in order to put a brake on the differential case, and a second friction brake that occupies an area between the differential case and the axle, and applies a pressing force in the axial direction to generate a frictional force in order to use a rotational difference to put the differential mechanism into a lock state. The second friction brake is placed within the radius of the first friction brake. Since the first friction brake and the second friction brake are arranged in a stacked manner in the radial direction, a reduction in the size is accomplished and the length of the final reduction gear unit in the vehicle-transverse direction can be shorter. As a result, a vehicle final reduction gear unit allowing a reduction in size can be provided.

According to an embodiment of the present invention, the first friction brake comprises a plurality of first rotation friction discs which are spline-fitted into the cylinder-shaped outer peripheral surface of the first friction brake supporter and are arranged alternately with the stationary friction discs. The second friction brake comprises a plurality of second rotation friction discs which are spline-fitted into the cylinder-shaped inner peripheral surface of the first friction brake supporter. Since the first friction brake and the second friction brake are arranged in a stack manner in the radial direction of the first friction brake supporter formed in a cylindrical shape, a final reduction gear unit that is reduced in size can be achieved while ensuring the functions of the two multi-disc wet brakes.

According to an embodiment of the present invention, the right case member disposed on the right side of the central case member has an end wall. The central case member has a brake support wall formed integrally therewith and protruding inward in the radial direction such that the brake support wall receives the pressing force of the first friction brake. While effectively using the brake support wall of the central case member and the end wall of the right case member, the stationary friction discs and the first rotation friction discs are placed between the brake support wall and the end wall. This makes it possible to achieve a further reduction in the size of the final reduction gear unit.

According to an embodiment of the present invention, the second rotation friction discs and the axle-side friction discs are placed between a side wall of the differential case and the end wall of the right case member with the interposition of a thrust bearing. While effectively using the side wall and the end wall, the second rotation friction discs and the axle-side friction discs are placed between the side wall and the end wall. This makes it possible to further achieve a reduction in size of the final reduction gear unit.

According to an embodiment of the present invention, the final reduction gear unit comprises a brake operation device for braking the vehicle by activating the first friction brake and the second friction brake, and a diff-lock operation device for putting the differential mechanism into a lock state by activating the second friction brake alone. Since the diff-lock operation device which activates only the second friction brake is provided, the left and right wheels can be braked when the brake operation device is operated. In addition, the driving and braking operations can be carried out under a diff-lock state.

According to an embodiment of the present invention, the slip torque of the second friction brake is set to half the braking force of the first friction brake. Since the first friction brake and the second friction brake are independent of each other, slip torque of the first friction brake and slip torque of the second friction brake can be set separately. If the slip torque of the second friction brake is set to half the braking force of the first friction brake, braking forces of equal magnitude can be applied to the right and left wheels.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments of the present invention will be described below with reference to the accompanying drawings.

Figure 1:
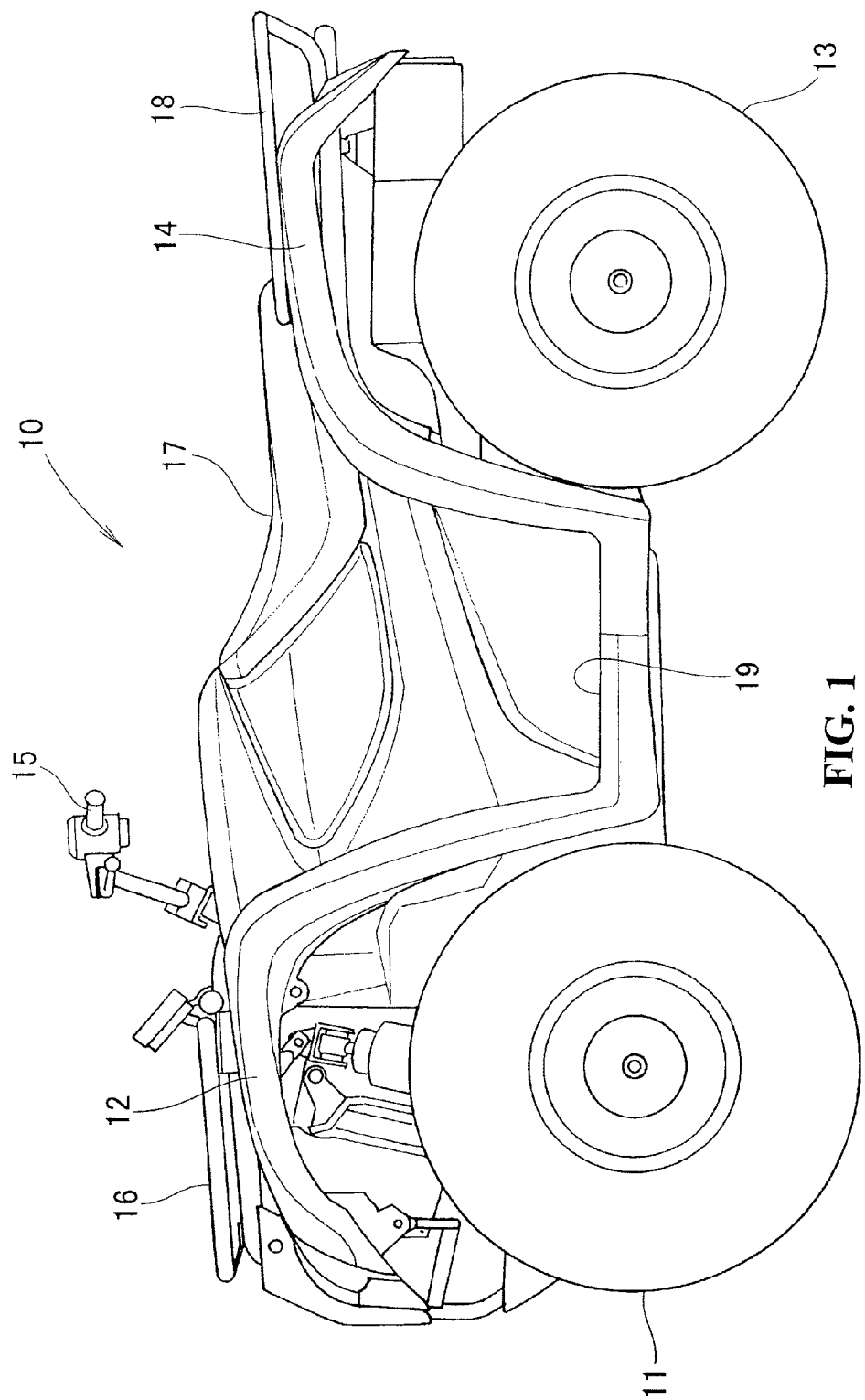
FIG. 1 is a left side view of a vehicle.

As illustrated in FIG. 1, a vehicle 10 is a small vehicle, which includes front wheels 11 provided in a front lower portion of the vehicle body, front fenders 12 above the front wheels 11, rear wheels 13 in a rear lower portion the vehicle body, rear fenders 14 above the rear wheels 13, steering handlebars 15 above the front wheels 11, a front luggage rack 16 in front of the steering handlebars 15, a seat 17 behind the steering handlebars 15, and a rear luggage rack 18.

Figure 2:
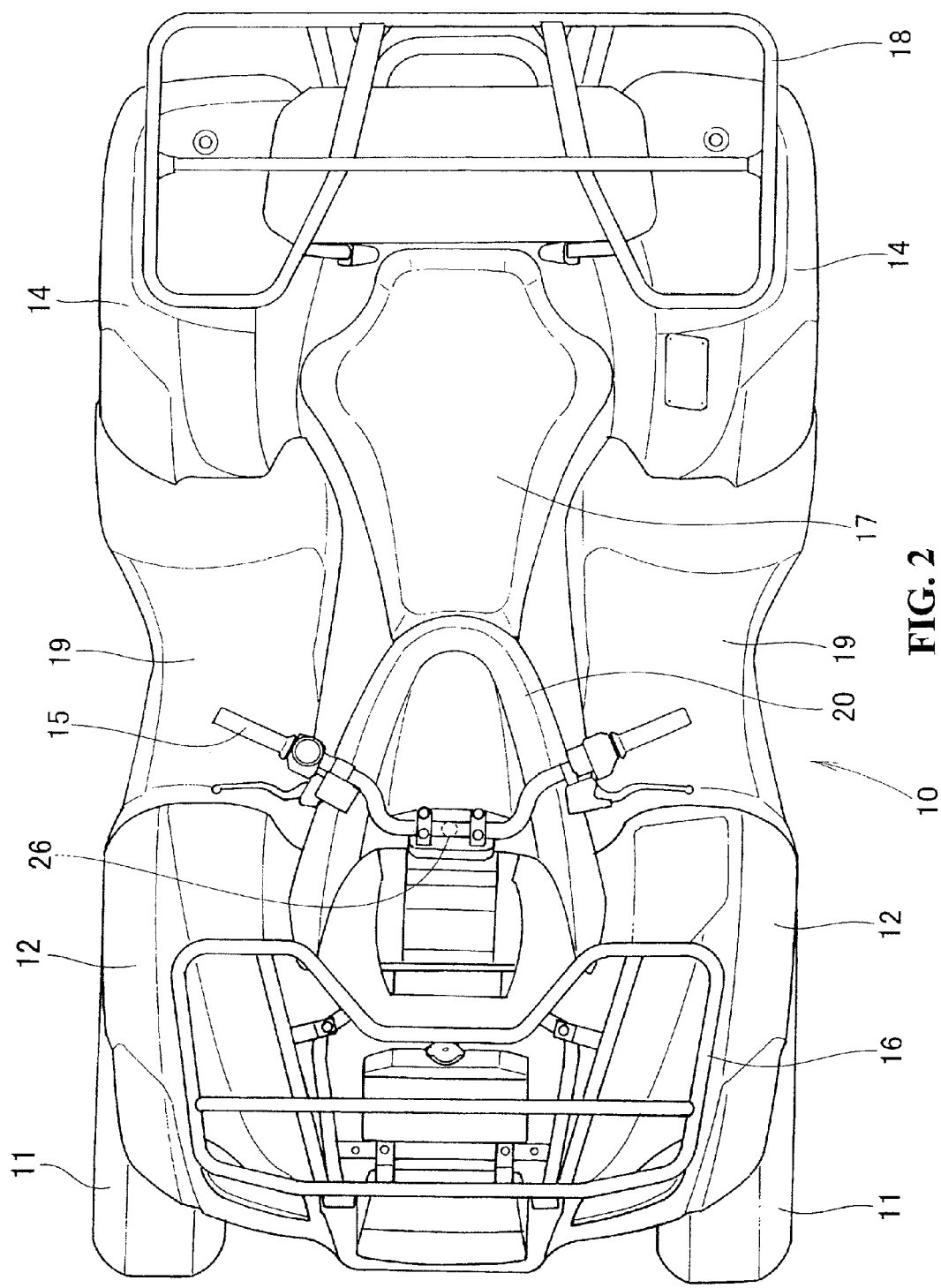
FIG. 2 is a plane view of a vehicle.

As illustrated in FIG. 2, the vehicle 10 is a saddle-ride type ATV, which includes right and left footboards 19 provided between the steering handlebars 15 and the seat 17 so that the driver sitting on the seat 17 can rest his/her foot on the footboards 19. Also the vehicle 10 is equipped with a front cover 20 which is disposed between a steering shaft 26 and the seat 17 and covers a described-later air cleaner (FIG. 3, reference numeral 23).

Figure 3:
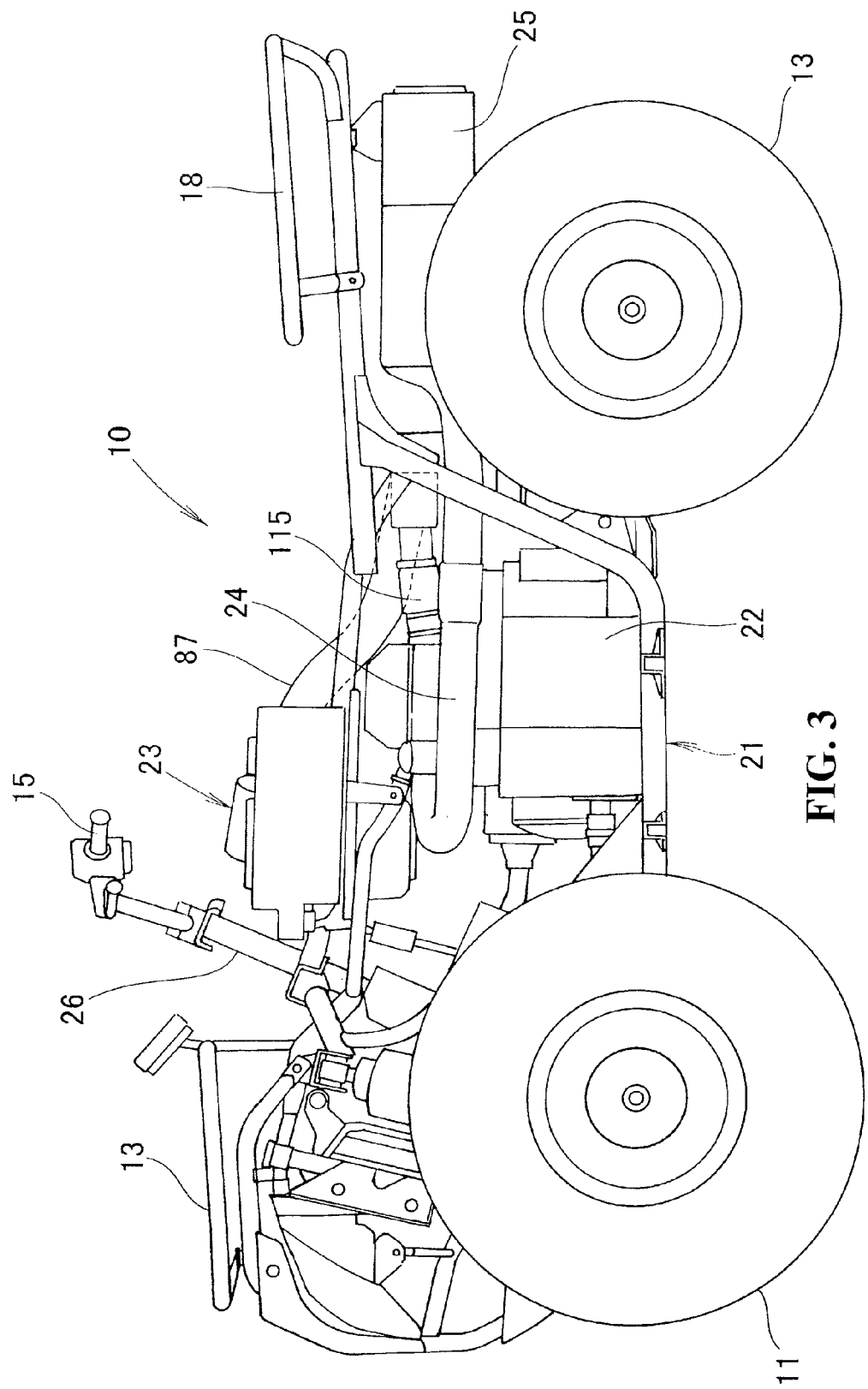
FIG. 3 is a left side view of a vehicle without a vehicle cover.

As illustrated in FIG. 3, the vehicle 10 is a small vehicle, which includes a prime mover 22 such as a gasoline engine or the like mounted in the center of a vehicle-body frame 21. The air sucked through an air cleaner 23 mounted on the vehicle-body frame 21 is mixed with fuel, which is then burned in the prime mover 22. The exhaust gas is emitted to the outside through an exhaust pipe 24 extending from the prime mover 22 and a muffler 25 connected to the rear end of the exhaust pipe 24. The produced power is transmitted to the front wheels 11 rotatably mounted to a front lower portion of the vehicle-body frame 21 and/or rear wheels 13 rotatably mounted to a rear lower portion of the vehicle-body frame 21, so that the vehicle 10 may be operated. The vehicle 10 can be steered by a steering shaft 26 rotatably mounted to a front upper portion of the vehicle-body frame 21 and the steering handlebars 15 rotating the steering shaft 26.

Any type of prime mover 22 can be employed as long as it is a prime mover such as a gasoline engine, a diesel engine, an electric motor or the like.

When the front wheel 11 and the rear wheel 13 have special wide and low pressure tires, called balloon tires, mounted thereon, the low-pressure tires deform to absorb road bumps and irregularities, so that the amount of sag can be reduced by the wide tires even when the ground of the road is soft and weak. For this reason, such a vehicle 10 is called an ATV (All Terrain Vehicle).

Figure 4:
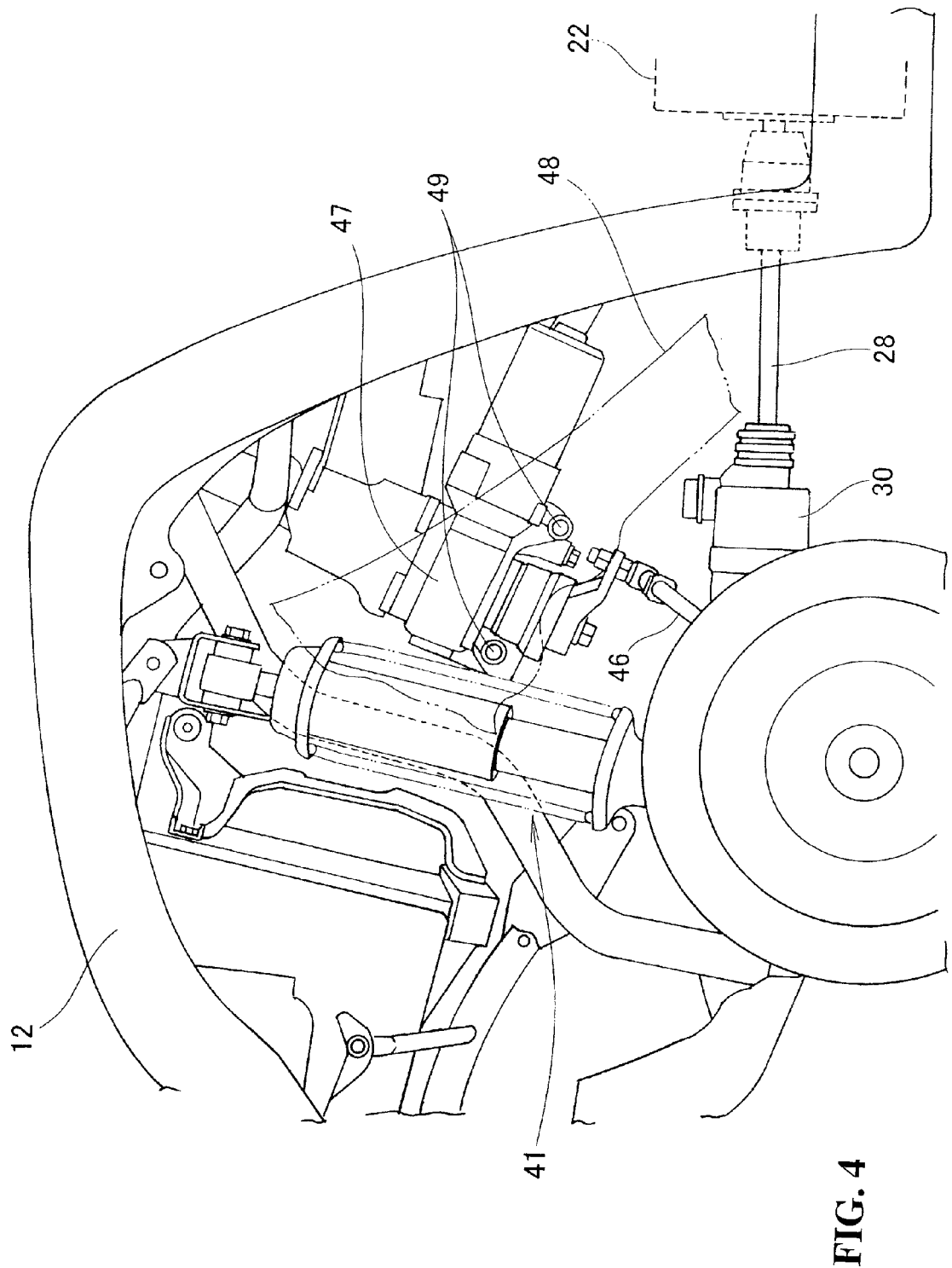
FIG. 4 is a side view illustrating a front-wheel suspension system.

Note that, as illustrated in FIG. 4, the drive force generated by the prime mover 22 is transmitted to the final reduction gear unit 30 through a drive shaft 28 such as a propeller shaft or the like.

Figure 5:
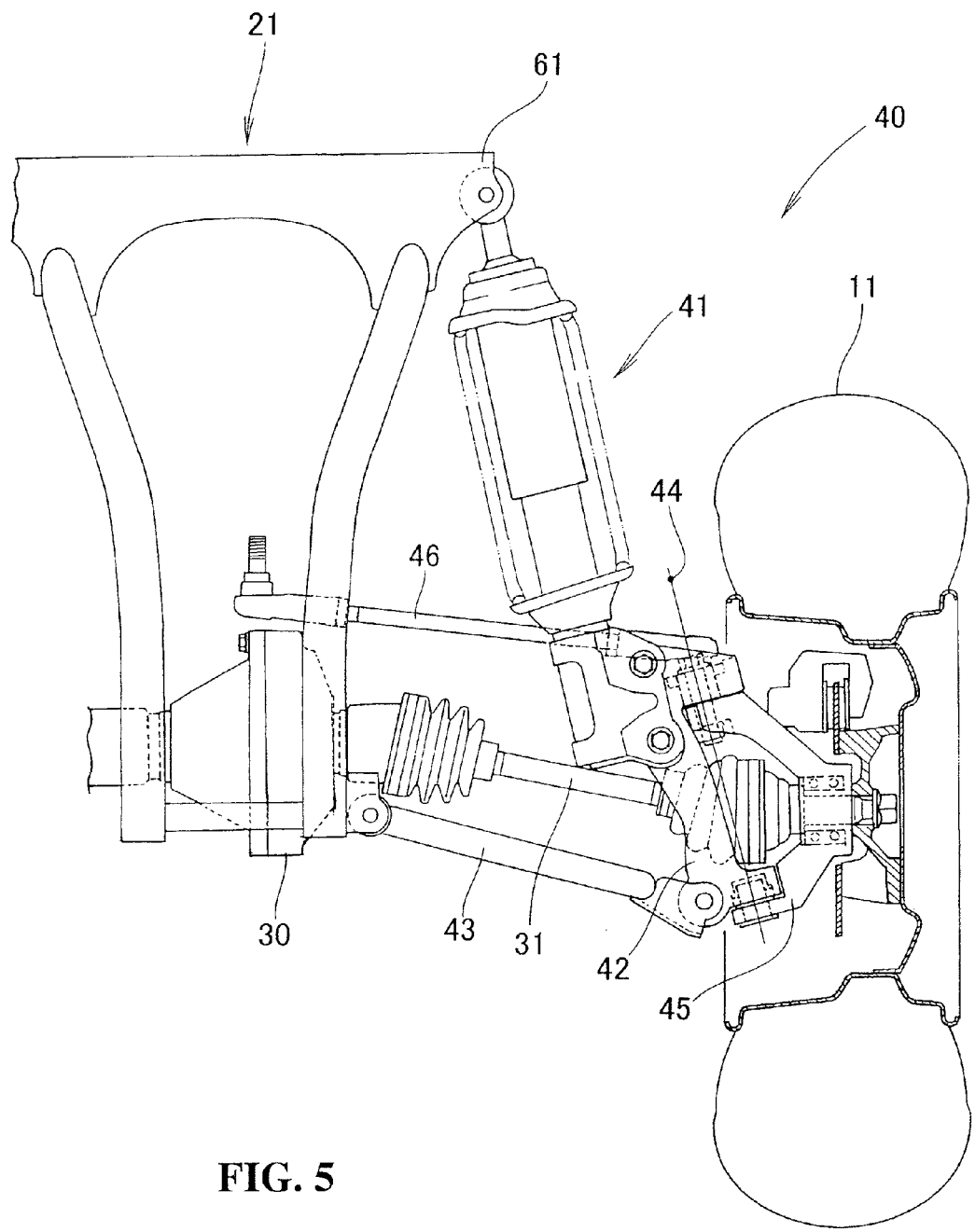
FIG. 5 is a front view illustrating a front-wheel suspension system.

As illustrated in FIG. 5, the power is transmitted from the final reduction gear unit 30 through axles 31 extending in the vehicle-transverse direction to the front wheels 11, thus rotating the front wheels 11.

As illustrated in FIG. 5, a front-wheel suspension system 40 includes a front cushion 41 coupled at its top end to the vehicle-body frame 21 and extending downwardly, a knuckle support member 42 extending downwardly from a lower portion of the front cushion 41, a lower arm 43 extending in the vehicle-transverse direction to couple a lower portion of the knuckle support member 42 to the vehicle-body frame 21, a knuckle 45 attached to the knuckle support member 42 to be rotatably around a kingpin axis 44 and supporting the front wheel 11, and a tie rod 46 extending in the vehicle-transverse direction and allowing the knuckle 45 to rotate about the kingpin axis 44.

As illustrated in FIG. 4, the tie rod 46 is coupled to an output shaft of a power steering unit 47. The power steering unit 47 is fastened at a front tension bracket 48 shown by the phantom line with bolts 49.

Next, the structure of the final reduction gear unit 30 will be described in detail.

Figure 6:
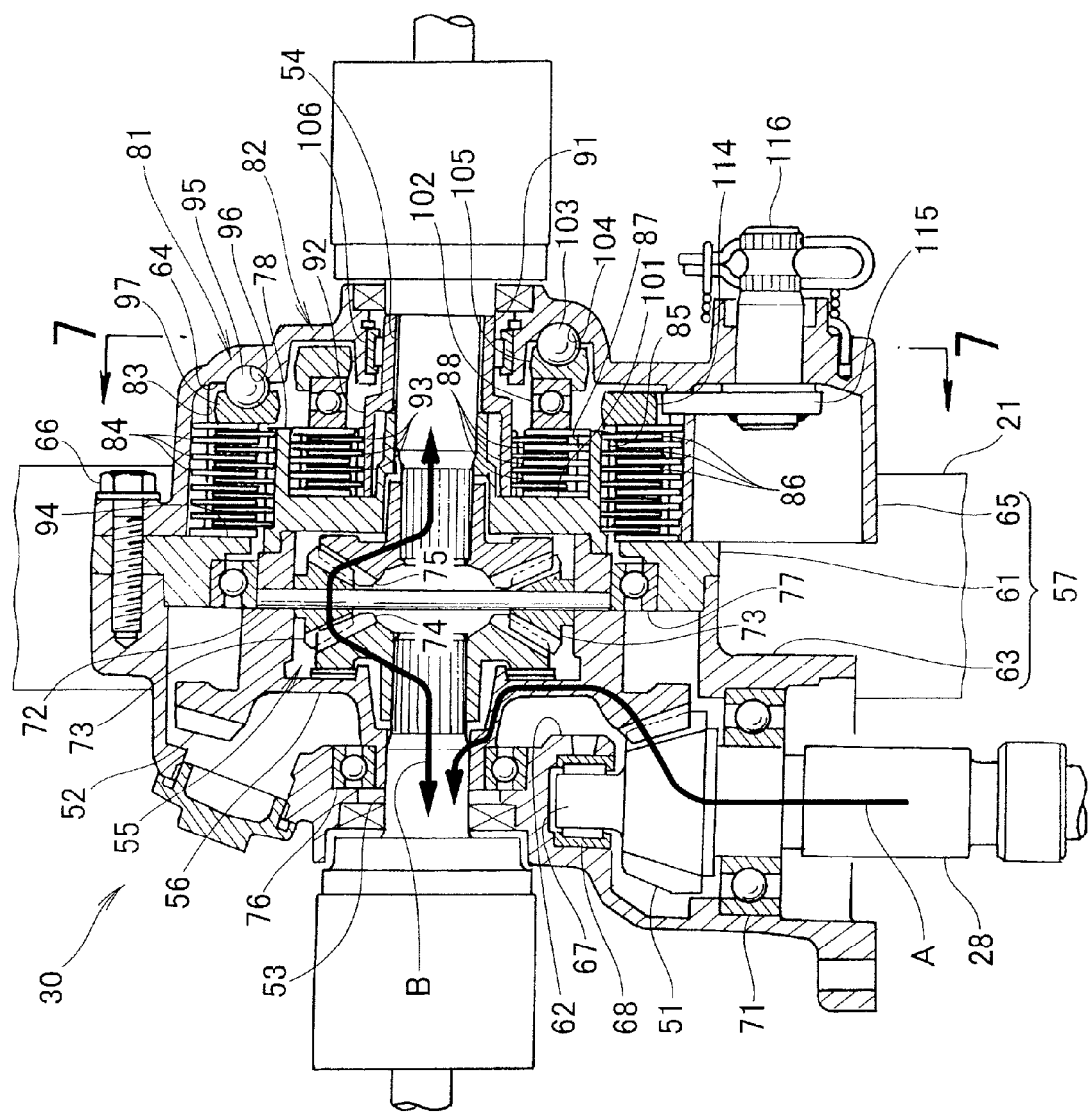
FIG. 6 is a sectional view of a final reduction gear unit.

As illustrated in FIG. 6, the final reduction gear unit 30 is attached to the vehicle-body frame 21. The final reduction gear unit 30 has a drive shaft 28 transmitting a drive force from a prime mover (FIG. 4, reference numeral 22), a small reduction gear 51 coupled to the drive shaft 28 so as to rotate, a large reduction gear 52 meshing with the small reduction gear 51 so as to rotate, and a differential mechanism 55 transmitting a drive force from the large reduction gear 52 to the left and right axles 53, 54.

The differential mechanism 55 is housed in a differential case 56. The small reduction gear 51, the large reduction gear 52 and the differential case 56 are housed in a final-reduction-gear case 57. The final-reduction-gear case 57 is fixed to the vehicle-body frame 21. Note that the differential case 56 and the large reduction gear 52 are integratedly formed.

The final-reduction-gear case 57 includes a cylinder-shaped central case member 61 having right and left opening ends in the vehicle-transverse direction, a left case member 63 placed on the left side of the central case member 61 and having an end wall 62, and a right case member 65 placed on the right side of the central case member 61 and having an end wall 64. The central case member 61 is tightly placed between the left and right case members 63, 65 and integratedly fastened to the left and right case members 63, 65 with bolts 66.

A protrusion 67 is provided at the leading end of the small reduction gear 51, and rotatably supported by the left case member 63 through a needle bearing 68. The drive shaft 28 is rotatably supported by the left case member 63 through a ball bearing 71.

The differential mechanism 55 includes a support shaft 72 secured to the differential case 56 in a direction perpendicular to the axles 53, 54, a plurality of small differential gears 73 rotatably mounted on the support shaft 72, a large left differential gear 74 meshing with the small differential gears 73 and rotate integrally with the left axle 53, and a large right differential gear 75 meshing with the small differential gears 73 and rotate integrally with the right axle 54. The rpm of the left and right axles 53, 54 is appropriately distributed, resulting in smooth vehicle driving.

The differential case 56 is rotatably supported by a ball bearing 76 mounted in the left case member 63 and a ball bearing 77 mounted in the central case member 61. A cylinder-shaped first friction brake supporter 78 extending in the vehicle transverse direction is provided at the end of the differential case 56. In this regard, the first friction brake supporter 78 virtually forms a part of the differential case 56, and rotates together with the differential case 56.

The final reduction gear unit 30 has a first friction brake 81 which occupies an area between the right case member 65 which is a stationary body and the differential case 56 which is a rotating body, and applies a pressing force in the axial direction to generate a frictional force in order to put a brake on the differential case 56. The final reduction gear unit 30 also has a second friction brake 82 which occupies an area between the differential case 56 and the right axle 54, and applies a pressing force in the axial direction to generate a frictional force in order to use a rotational difference to put the differential mechanism 55 into a lock state. The second friction brake 82 is placed within the radius of the first friction brake 81.

The first friction brake 81 includes the first friction brake supporter 78, a plurality of stationary friction discs 84 which are spline-fitted into a cylinder-shaped inner peripheral surface 83 of the right case member 65 and are able to move in the axial direction, and a plurality of first rotation friction discs 86 which are spline-fitted into a cylinder-shaped outer peripheral surface 85 of the first friction brake supporter 78 and arranged alternately with the stationary friction discs 84.

The second friction brake 82 includes a plurality of second rotation friction discs 88 which are spline-fitted into a cylinder-shaped inner peripheral surface 87 of the first friction brake supporter 78, a collar 91 which is spline-fitted into the right axle 54, and a plurality of axle-side friction discs 93 which are spline-fitted into a cylinder-shaped outer peripheral surface 92 of the collar 91 and arranged alternately with the second rotation friction discs 88.

The central case member 61 has a brake support wall 94 provided integrally therewith. The brake support wall 94 protrudes inward in the radial direction to receive a pressing force of the first friction brake. Also, first hemispherical recesses 96 are formed in the end wall 64 of the right case member 65 and hold first steel balls 95. A first cam ring 97 is placed on the opposite side of the first steel balls 95.

The stationary friction discs 84 and the first rotation friction discs 86 are placed between the brake support wall 94 and the right end wall 64, and the brake support wall 94 and the right end wall 64 receive the reaction force to the pressing of the brake.

The second rotation friction discs 88 and the axle-side friction discs 93 are placed between a side wall 101 of the first friction brake supporter 78 and the right end wall 64 with the interposition of a thrust bearing 102. Second hemispherical recesses 104 holding second steel balls 103 are provided in the end wall 64 of the right case member 65, and a second cam ring 105 is placed on the opposite side of the second steel balls 103. The side wall 101 and the right end wall 64 receive the reaction force to the pressing of the brake.

The collar 91 in which the axle-side friction discs 93 are spline-fitted is rotatably supported by the needle bearing 106 which is mounted in the right case member 65.

The slip torque of the second friction brake 82 is set to half the braking force of the first friction brake 81.

The drive force from the prime mover (FIG. 3, reference numeral 22) is transmitted as indicated with the heavy arrow A and the forces of the left and right axles 53, 53 are transmitted as indicated with the heavy arrows B.

Next, the brake operation device and the diff-lock operation device will be described.

Figure 7:
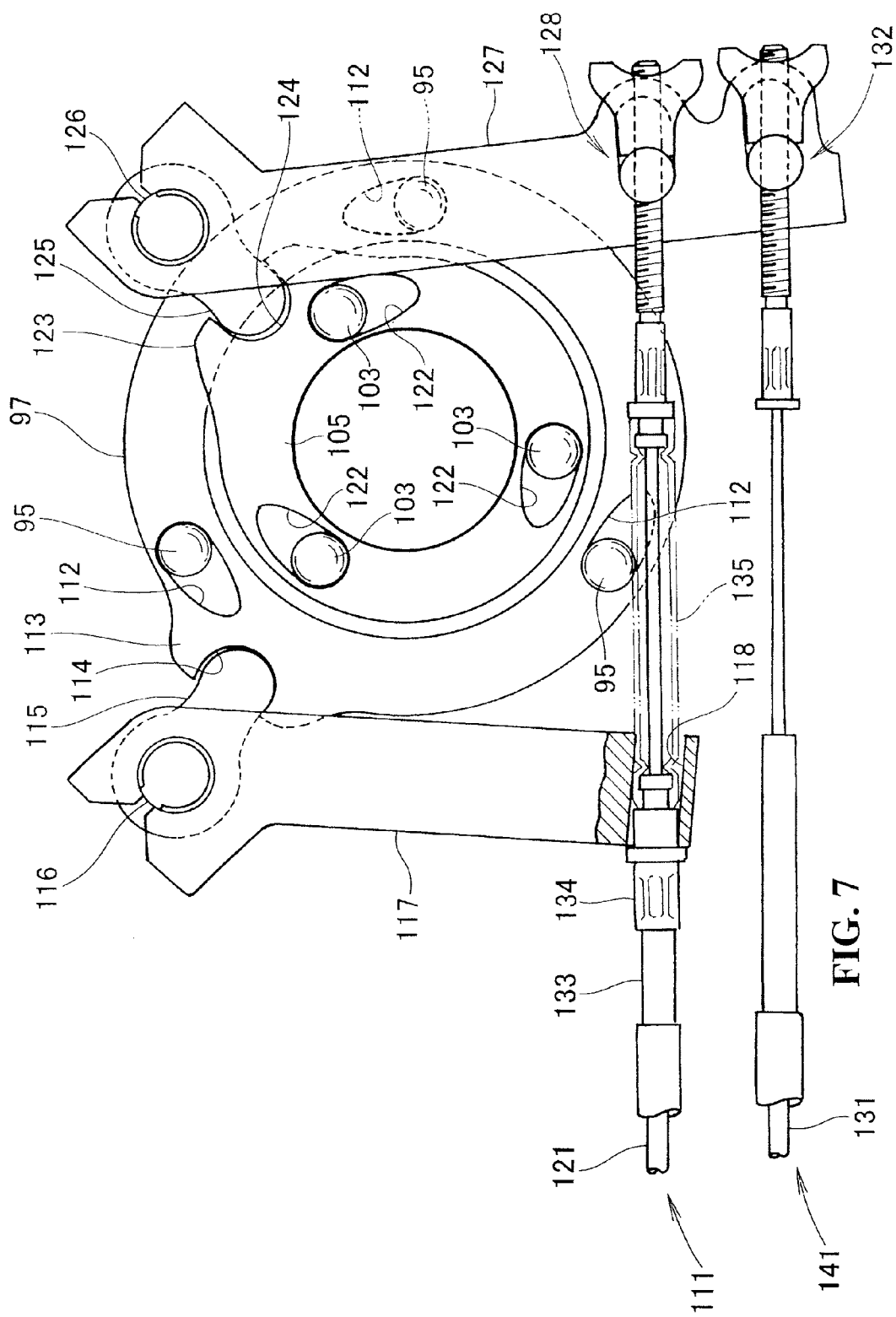
FIG. 7 is a fragmentary view taken in the direction of the arrows 7 in FIG. 6.

As illustrated in FIG. 7, in the brake operation device 111 the first steel balls 95 are movably placed in first cam grooves 112 of the first cam ring 97. The first cam ring 97 has a protrusion 113 on the outer periphery, and a brake operation member 115 engages with a semicircle-shaped recess 114 formed in the protrusion 113. The brake operation member 115 is mounted on a brake shaft 116 rotatably attached to the right case member (FIG. 6, reference numeral 65) such that the brake operation member 115 rotates integrally with the brake shaft 116.

A brake arm 117 is attached to the brake shaft 116 such that the brake arm 117 rotates integrally with the brake shaft 116. The brake arm 117 has a through hole 118 drilled in the end opposite to the end attached to the brake shaft 116. A brake wire 121 is inserted through the through hole 118.

The second steel balls 103 are movably placed in second cam grooves 122 of the second cam ring 105. The second cam ring 105 has a protrusion 123 on the outer periphery, and a diff-lock operation member 125 engages with a semicircle-shaped recess 124 formed in the protrusion 123. The diff-lock operation member 125 is mounted on a diff-lock shaft 126 rotatably attached to the right case member 65 such that the diff-lock operation member 125 rotates integrally with the diff-lock shaft 126.

A diff-lock arm 127 is attached to the diff-lock shaft 126 such that the diff-lock arm 127 rotates integrally with the diff-lock shaft 126. In the diff-lock arm 127, a brake wire fastener 128 for fastening the brake wire 121 is provided at the end of the diff-lock arm 127 opposite to the end attached to the diff-lock shaft 126, and a diff-lock wire fastener 132 for fastening a diff-lock wire 131 is provided below the brake wire fastener 128.

The brake wire 121 is inserted through a brake tube 133. A stopper 134 is attached to a portion of the brake tube 133 corresponding to the brake arm 117 for preventing the brake tube 133 from entering the through hole 118. The brake wire 121 is inserted through a flexible tube 135 shown by the phantom line between brake arm 117 and diff-lock arm 127.

Upon a pull on the brake wire 121, the brake arm 117 and the diff-lock arm 127 are respectively rotated in the directions in which the brake arm 117 and the diff-lock arm 127 move toward each other.

The diff-lock operation device 141 includes the above-described second cam ring 105, second steel balls 103, diff-lock operation member 125, diff-lock shaft 126, diff-lock arm 127, diff-lock wire 131 and the diff-lock fastener 132. The diff-lock wire 131 is inserted through a diff-lock tube 142.

Upon a pull on the diff-lock wire 131, the diff-lock arm 127 alone rotates.

Next, the action of the brake operation device 111 described above will be described.

Figure 8A:
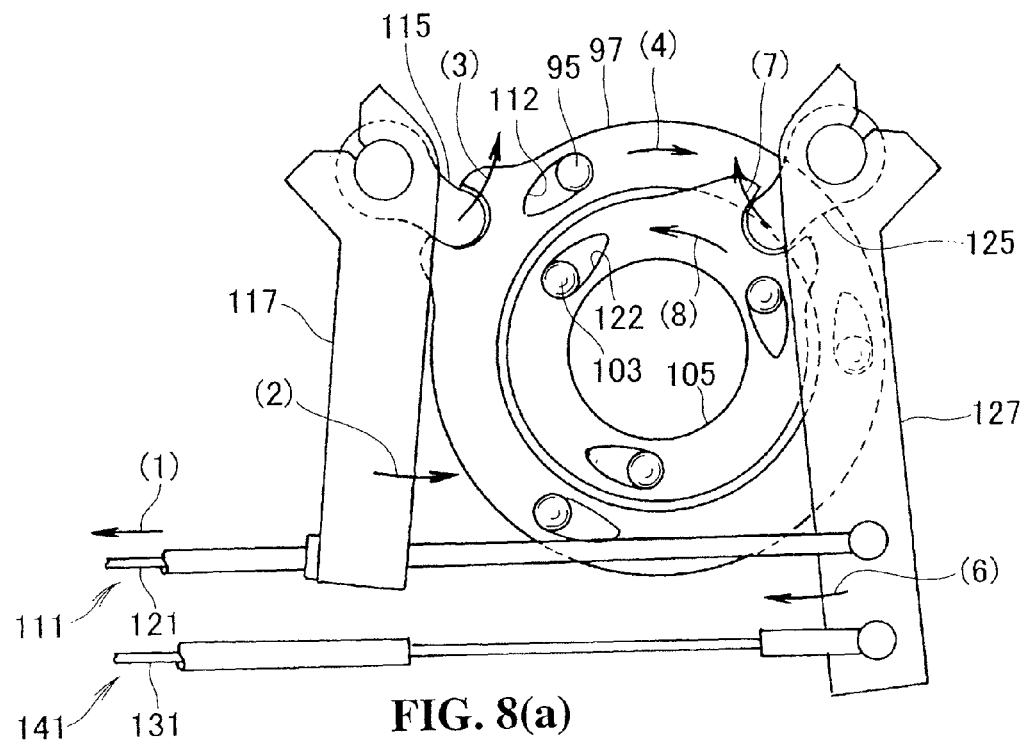
FIGS. 8(a), 8(b) and 8(c) are action diagrams of a brake operation device.

As illustrated in FIG. 8(a), when the brake wire 121 is pulled as shown by the arrow (1), the brake arm 117 rotates and moves as shown by the arrow (2). By movement of the brake operation member 115 as shown by the arrow (3), the first cam ring 97 moves as shown by the arrow (4).

Figure 8B:
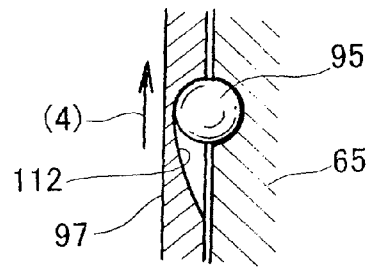

FIG. 8(b) is a diagram illustrating movement of the first cam ring 97, in which, when the first cam ring 97 moves as shown by the arrow (4), the first steel ball 95 relatively moves along the inclination of the first cam groove 112.

Figure 8C:
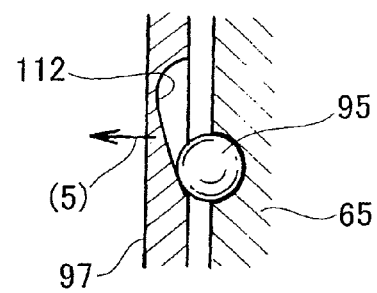

FIG. 8(c) is a diagram illustrating movement of the first cam ring 97, in which the first cam ring 97 moves as shown by the arrow (5).

Figure 9:
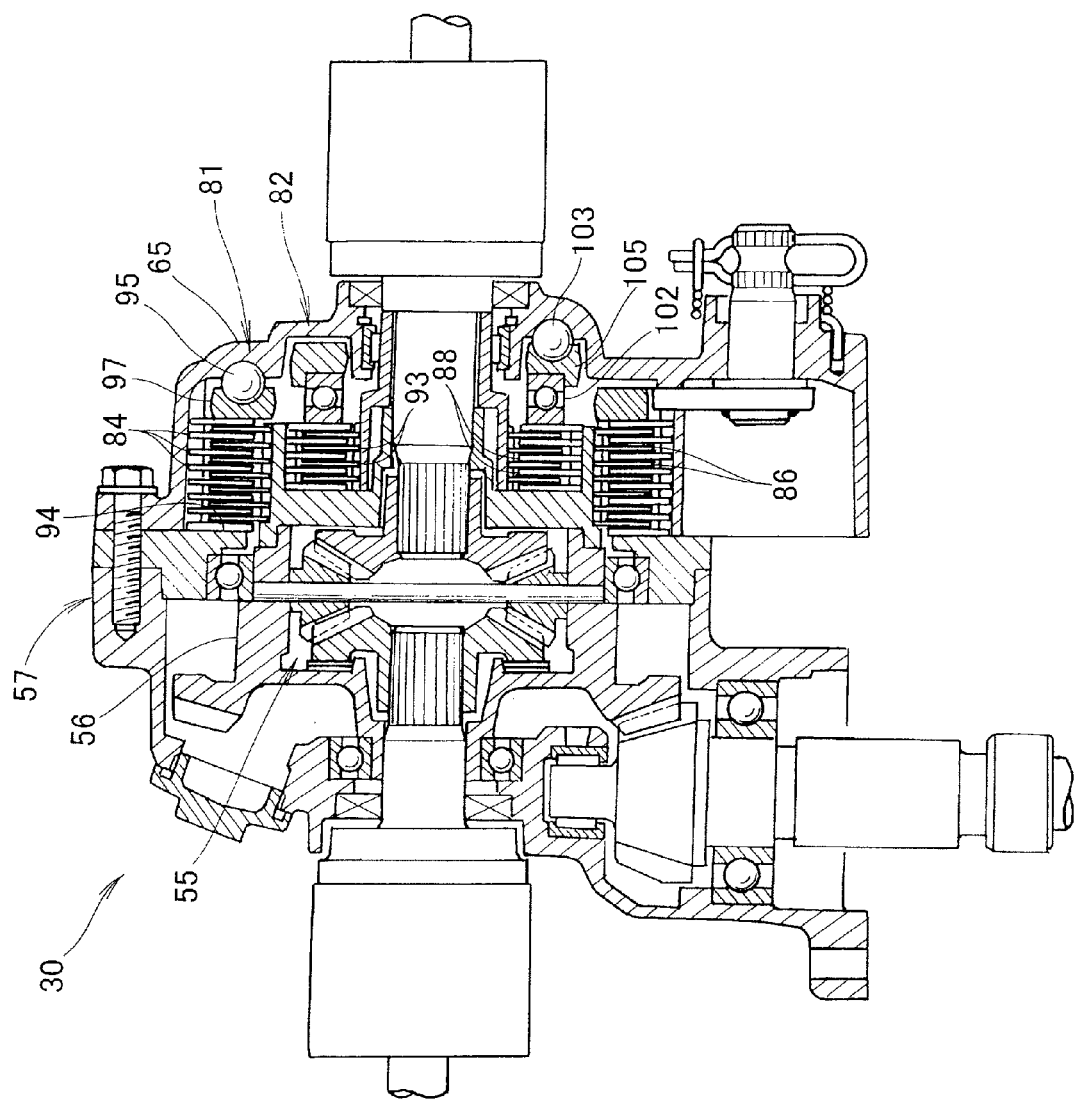
FIG. 9 is an action diagram of a final reduction gear unit under braking.

Then, as shown in FIG. 9, the first cam ring 97 presses the stationary friction discs 84 and the first rotation friction discs 86, thus braking the differential case 56.

As illustrated in FIG. 8(a), simultaneously with movement of the brake arm 117, the diff-lock arm 127 rotates and moves as shown by the arrow (6). By movement of the diff-lock operation member 125 as shown by the arrow (7), the second cam ring 105 moves as shown by the arrow (8).

As illustrated in FIG. 9, the second cam ring 105 presses the second rotation friction discs 88 and the axle-side rotation friction discs 93, thus locking the differential mechanism 55.

Next, the action of the diff-lock device 141 will be described.

Figure 10:
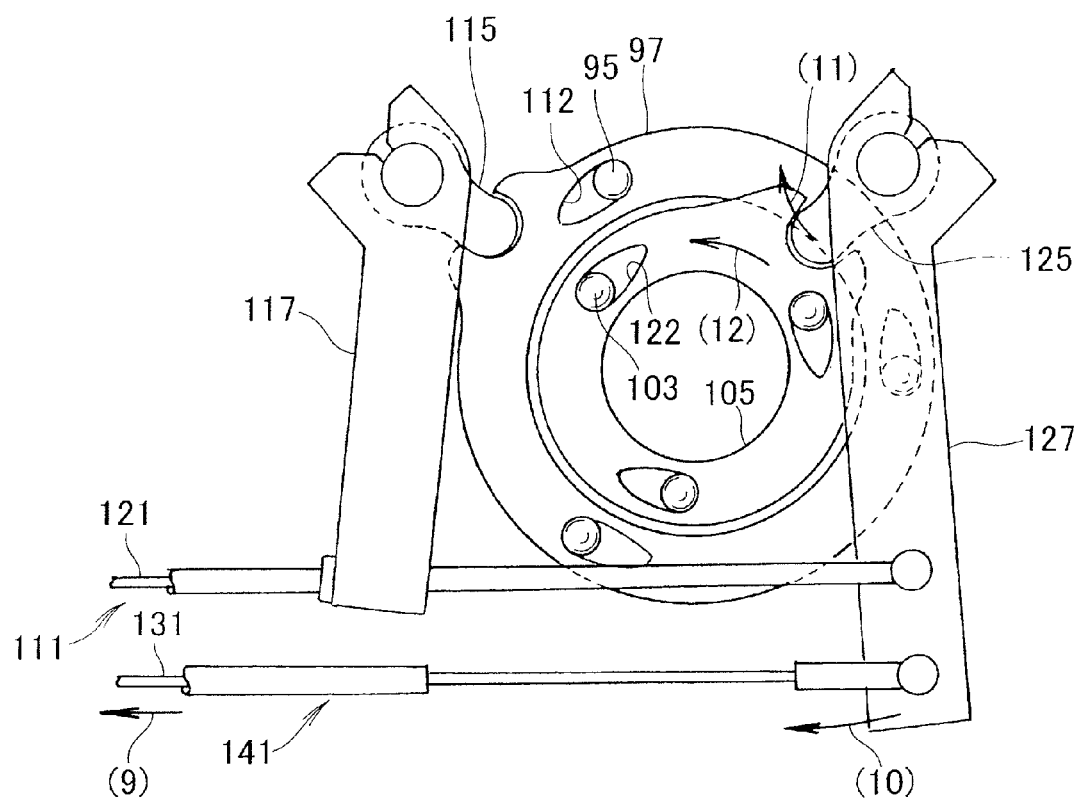
FIG. 10 is an action diagram of a diff-lock operation device.

As illustrated in FIG. 10, upon a pull on the diff-lock wire 131 as shown by the arrow (9), the diff-lock arm 127 rotates and moves as shown by the arrow (10), so that the diff-lock operation member 125 moves as shown by the arrow (11).

Figure 11:
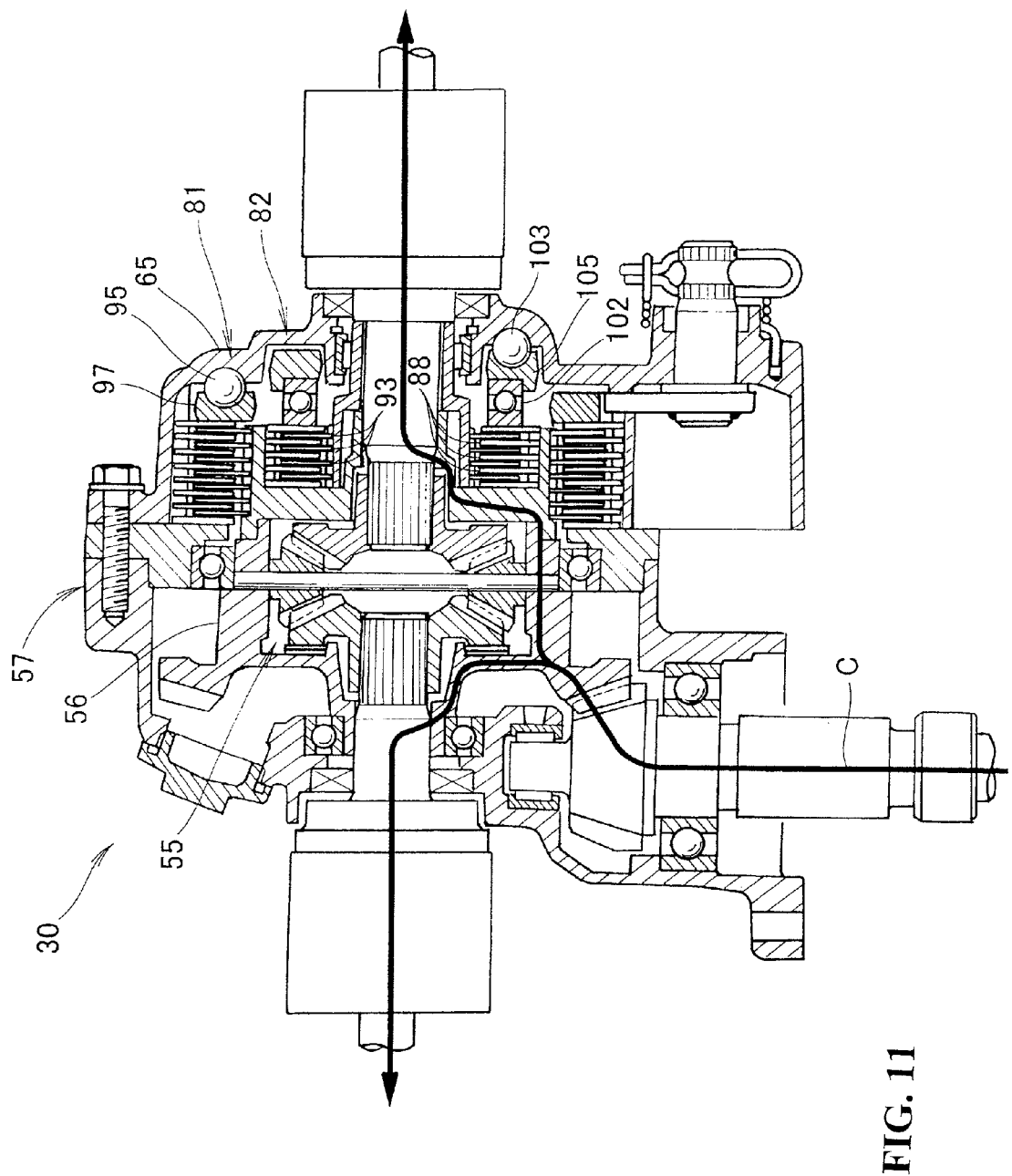
FIG. 11 is an action diagram of a final reduction gear unit during diff lock.

As shown in FIG. 11, the second rotation friction discs 88 and the axle-side rotation friction discs 93 are pressed, so that the differential mechanism 55 is locked.

The drive force from the prime mover (FIG. 3, reference numeral 22) is transmitted as shown by the heavy arrows C.

Next, embodiment 2 according to the present invention will be described with reference to the drawings. The same components as those illustrated in FIG. 6 are designated by the same reference numerals and the description is omitted.

Figure 12:
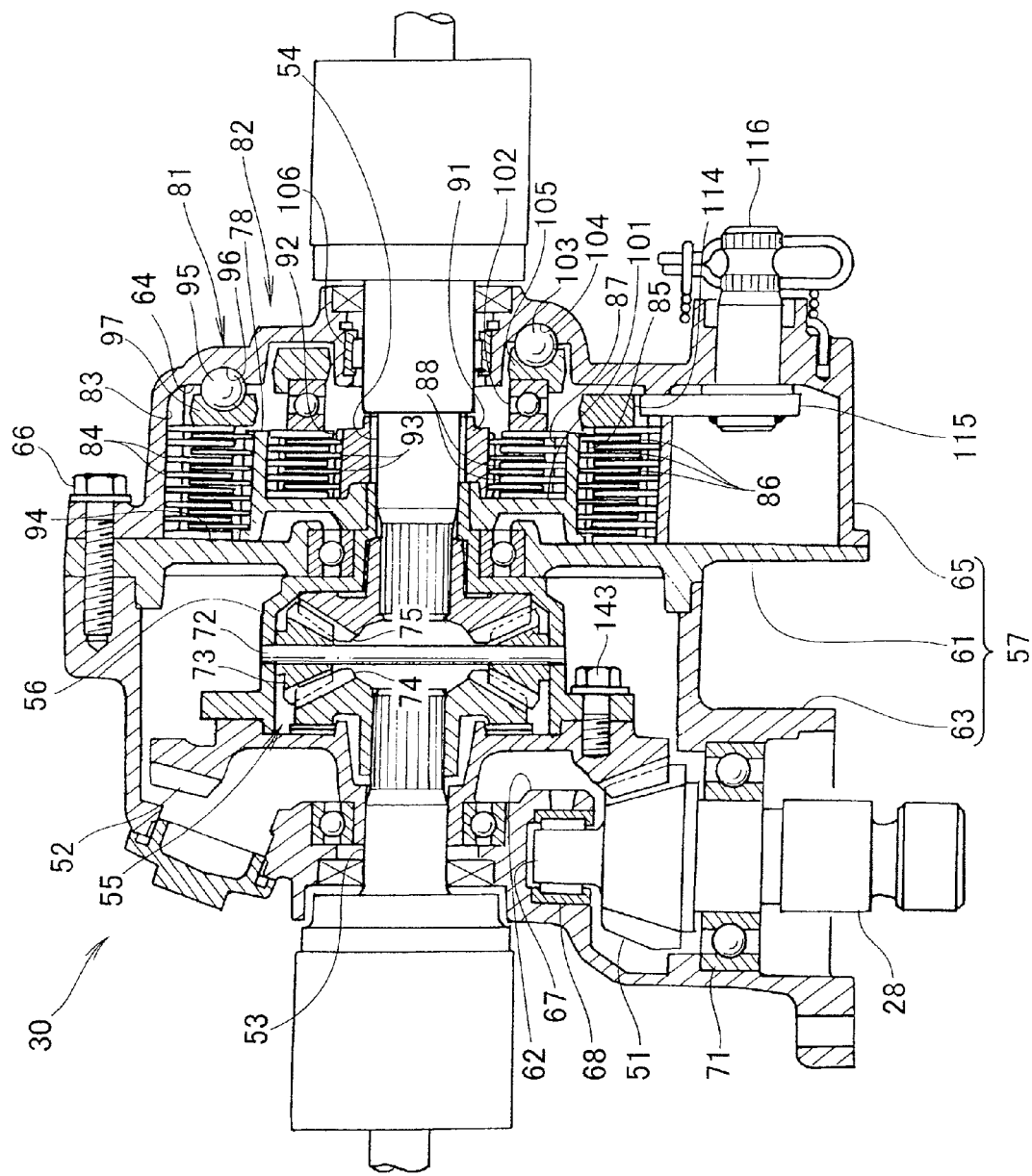
FIG. 12 is a sectional view of a final reduction gear unit according to another embodiment.

As illustrated in FIG. 12, in the final reduction gear unit 30, the central case member 61 extends from the outside to an area near the right axle 54. The differential case 56 and the large reduction gear 52 are separated components, which are fastened by bolts 143.

The foregoing contents will be described below in brief.

As described with respect to FIG. 6, a vehicle final reduction gear unit 30 has a prime mover (FIG. 3, reference numeral 22) generating a drive force, a drive shaft 28 transmitting a drive force from the prime mover 22, a small reduction gear 51 coupled to the drive shaft 28 and thus rotating, a large reduction gear 52 meshing with the small reduction gear 51 and thus rotating, a differential mechanism 55 transmitting a drive force from the large reduction gear 52 to left and right axles 53, 54, a differential case 56 housing the differential mechanism 55, and a final-reduction-gear case 57 housing the small reduction gear 51 provided closer to the vehicle body, the large reduction gear 52, the differential mechanism 55 and the differential case 56. The vehicle final reduction gear unit 30 has a first friction brake 81 occupying an area between the final-reduction-gear case 57 which is a stationary body and the differential case 56 which is a rotating body and applying a pressing force in the axial direction to generate a frictional force in order to put a brake on the differential case 56, and a second friction brake 82 occupying an area between the differential case 56 and the axle 54, and applying a pressing force in the axial direction to generate a frictional force in order to use a rotational difference to put the differential mechanism 55 into a lock state, in which the second friction brake 82 is placed within the radius of the first friction brake 81.

With this configuration, since the first friction brake 81 and the second friction brake 82 are arranged in a stack manner in the radial direction, a reduction in size is accomplished and the length of the final reduction gear unit 30 in the vehicle-transverse direction can be shorter. As a result, a vehicle final reduction gear unit 30 allowing a reduction in size can be provided.

As described with respect to FIG. 6, the first friction brake 81 includes a cylinder-shaped first friction brake supporter 78 which is mounted to the differential case 56 and extends from one of the left and right ends of the differential case 56 in the vehicle-transverse direction, a plurality of stationary friction discs 84 which are spline-fitted into a cylinder-shaped inner peripheral surface 83 of the final-reduction-gear case 57 and able to move in the vehicle-transverse direction, and a plurality of first rotation friction discs 86 which are spline-fitted into a cylinder-shaped outer peripheral surface 85 of the first friction brake supporter 78 and arranged alternately with the stationary friction discs 84. The second friction brake 82 includes a plurality of second rotation friction discs 88 which are spline-fitted into a cylinder-shaped inner peripheral surface 87 of the first friction brake supporter 78, a collar 91 which is spline-fitted into the right axle 54, and a plurality of axle-side friction discs 93 which are spline-fitted into a cylinder-shaped outer peripheral surface 92 of the collar 91 and arranged alternately with the second rotation friction discs 88.

With this configuration, since the first friction brake 81 and the second friction brake 82 are arranged in a stack manner in the radial direction of the first friction brake supporter 78 formed in a cylindrical shape, a final reduction gear unit 30 reduced in size can be achieved while ensuring the functions of the two multi-disc wet brakes 81, 82.

As described with respect to FIG. 6, the final-reduction-gear case 57 includes a cylinder-shaped central case member 61 having left and right opening ends in the vehicle-transverse direction, a left case member 63 placed on the left side of the central case member 61 and having an end wall 62, and a right case member 65 placed on the right side of the central case member 61 and having an end wall 64. The central case member 61 is tightly placed between the left and right case members 63, 65 and integratedly fastened to the left and right case members 63, 65. The central case member 61 has a brake support wall 94 provided integrally therewith. The brake support wall 94 protrudes inward in the radial direction to receive a pressing force of the first friction brake 81. The stationary friction discs 84 and the first rotation friction discs 86 are placed between the brake support wall 94 and the end wall 64, and the brake support wall 94 and the end wall 64 receive the reaction force to the pressing of the brake.

With this configuration, while effectively using the brake support wall 94 of the central case member 61 and the end wall 64 of the right case member 65, the stationary friction discs 84 and the first rotation friction discs 86 are placed between the brake support wall 94 and the end wall 64. This makes it possible to achieve a further reduction in size of the final reduction gear unit 30.

As described with respect to FIG. 6, the second rotation friction discs 88 and the axle-side friction discs 93 are placed between a side wall 101 of the differential case 78 and the end wall 64 with the interposition of a thrust bearing 102, and the side wall 101 and the end wall 64 receive the reaction force to the pressing of the brake.

With this configuration, while effectively using the side wall 101 and the end wall 64, the second rotation friction discs 88 and the axle-side friction discs 93 are placed between the side wall 101 and the end wall 64. This makes it possible to achieve a further reduction in the size of the final reduction gear unit 30.

As described with respect to FIG. 7, a brake operation device 111 for braking the vehicle by activating the first friction brake (FIG. 6, reference numeral 81) and the second friction brake (FIG. 6, reference numeral 82), and a diff-lock operation device 141 for putting the differential mechanism (FIG. 6, reference numeral 55) into a lock state by activating the second friction brake 82 alone, are provided.

With this configuration, since the diff-lock operation device 141 which activates the second friction brake 82 alone is provided, it is possible to put brakes on the left and right wheels (FIG. 2, reference numeral 11) when the brake operation device 111 is operated, and also to carry out driving and braking under a diff-lock state.

As described with respect to FIG. 6, the slip torque of the second friction brake 82 is set to half the braking force of the first friction brake 81.

With this configuration, since the first friction brake 81 and the second friction brake 82 are independent of each other, slip torque of the first friction brake 81 and slip torque of the second friction brake 82 can be set separately. If the slip torque of the second friction brake 82 is set to half the braking force of the first friction brake 81, a braking force of magnitude equal to that in a vehicle equipped with wheel brakes on the respective wheels 11 can be applied to the right and left wheels 11.

A vehicle final reduction gear unit according to the present invention is suitable for use in small vehicles, in particular, in ATVs, but may apply to general vehicles without any problem.

A vehicle final reduction gear unit according to the present invention is suitable for use in ATVs.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle final reduction gear unit comprising:
   a prime mover generating a drive force;
   a drive shaft transmitting a drive force from the prime mover;
   a small reduction gear coupled to the drive shaft for rotation;
   a large reduction gear meshing with the small reduction gear for rotation;
   a differential mechanism transmitting a drive force from the large reduction gear to left and right axles;
   a differential case housing the differential mechanism; and
   a final-reduction-gear case provided closer to a vehicle body, and housing the small reduction gear, the large reduction gear, the differential mechanism and the differential case;
   wherein the vehicle final reduction gear unit further includes:
   a first friction brake occupying an area between the final-reduction-gear case which is a stationary body and the differential case which is a rotating body for applying a pressing force in an axial direction to generate a frictional force in order to put a brake on the differential case; and
   a second friction brake occupying an area between the differential case and the right axle, for applying a pressing force in the axial direction to generate a frictional force in order to use a rotational difference to put the differential mechanism into a lock state;
   wherein the second friction brake is placed within the radius of the first friction brake,
   wherein the first friction brake comprises:
   a cylinder-shaped first friction brake supporter that is mounted to the differential case and extends from one of left and right ends of the differential case in the vehicle-transverse direction;
   a plurality of stationary friction discs that are spline-fitted into a cylinder-shaped inner peripheral surface of the final-reduction-gear case and able to move in an axial direction; and
   a plurality of first rotation friction discs that are spline-fitted into a cylinder-shaped outer peripheral surface of the first friction brake supporter and arranged alternately with the stationary friction discs; and
   the second friction brake comprises:
   a plurality of second rotation friction discs that are spline-fitted into a cylinder-shaped inner peripheral surface of the first friction brake supporter;
   a collar that is spline-fitted into the right axle; and
   a plurality of axle-side friction discs that are spline-fitted into a cylinder-shaped outer peripheral surface of the collar and arranged alternately with the second rotation friction discs.

2. The vehicle final reduction gear unit according to claim 1, wherein the final-reduction-gear case comprises:
   a cylinder-shaped central case member having left and right opening ends in the vehicle transverse direction;
   a left case member placed on the left side of the central case member and having an end wall; and
   a right case member placed on the right side of the central case member and having an end wall;
   wherein the central case member is tightly placed between the left and right case members, is integratedly fastened to the left and right case members, and has a brake support wall provided integrally therewith, the brake support wall protruding inward in the radial direction to receive a pressing force of the first friction brake; and
   wherein the stationary friction discs and the first rotation friction discs are placed between the brake support wall and the end wall, and the brake support wall and the end wall receive the reaction force to the pressing of the brake.

3. The vehicle final reduction gear unit according to claim 1, wherein the second rotation friction dies and the axle-side friction discs are placed between a side wall of the differential case and the end wall with interposition of a thrust bearing, and the side wall and the end wall receive the reaction force to the pressing of the brake.

4. The vehicle final reduction gear unit according to claim 1, comprising:
   a brake operation device for braking the vehicle by activating the first friction brake and the second friction brake; and
   a diff-lock operation device for putting the differential mechanism into a lock state by activating the second friction brake alone.

5. The vehicle final reduction gear unit according to claim 1, wherein slip torque of the second friction brake is set to half the braking force of the first friction brake.

6. A final reduction gear unit adapted to be used with a vehicle comprising:
   a drive shaft for transmitting a drive force;
   a small reduction gear operatively coupled to the drive shaft for rotation;
   a large reduction gear operatively meshing with the small reduction gear for rotation;
   a differential mechanism adapted to transmit a drive force from the large reduction gear to left and right axles;
   a differential case housing the differential mechanism; and
   a final-reduction-gear case provided closer to a vehicle body, and housing the small reduction gear, the large reduction gear, the differential mechanism and the differential case;
   wherein the vehicle final reduction gear unit further includes:
   first friction brake occupying an area between the final-reduction-gear case which is a stationary body and the differential case which is a rotating body for applying a pressing force in an axial direction to generate a frictional force in order to put a brake on the differential case; and
   a second friction brake occupying an area between the differential case and the right axle, for applying a pressing force in the axial direction to generate a frictional force in order to use a rotational difference to put the differential mechanism into a lock state;
   wherein the second friction brake is placed within the radius of the first friction brake,
   wherein the first friction brake comprises:
   a cylinder-shaped first friction brake supporter that is mounted to the differential case extends from one end of the differential case and opens in the vehicle-transverse direction toward a right case member, and the second friction brake comprises:

a plurality of second rotation friction discs that are spine-fitted into a cylinder-shaped inner peripheral surface of the first friction brake supporter.

7. The final reduction gear unit adapted to be used with a vehicle according to claim 6, wherein the first friction brake further comprises:

a plurality of stationary friction discs that are spline-fitted into a cylinder-shaped inner peripheral surface of the final-reduction-gear case and able to move in an axial direction; and a plurality of first rotation friction discs that are spline-fitted into a cylinder-shaped outer peripheral surface of the first friction brake supporter and arranged alternately with the stationary friction discs; and the second friction brake further comprises:

a collar that is spline-fitted into the axle; and a plurality of axle-side friction discs that are spline-fitted into a cylinder-shaped outer peripheral surface of the collar and arranged alternately with the second rotation friction discs.

8. The final reduction gear unit adapted to be used with a vehicle according to claim 6, wherein the final-reduction-gear case comprises:

a cylinder-shaped central case member having left and right opening ends in the vehicle-transverse direction;

a left case member placed on the left side of the central case member and having an end wall; and wherein the right case member is placed on the right side of the central case member and having an end wall;

wherein the central case member is tightly placed between the left and right case members, is integratedly fastened to the left and right case members, and has a brake support wall provided integrally therewith, the brake support wall protruding inward in the radial direction to receive a pressing force of the first friction brake; and wherein stationary friction discs and first rotation friction discs of the first friction brake are placed between the brake support wall and the end wall, and the brake support wall and the end wall receive the reaction force to the pressing of the brake.

9. The final reduction gear unit adapted to be used with a vehicle according to claim 7, wherein the final-reduction-gear case comprises:

a cylinder-shaped central case member having left and right opening ends in the vehicle-transverse direction;

a left case member placed on the left side of the central case member and having an end wall; and wherein the right case member placed on the right side of the central case member and having an end wall;

wherein the central case member is tightly placed between the left and right case members, is integratedly fastened to the left and right case members, and has a brake support wall provided integrally therewith, the brake support wall protruding inward in the radial direction to receive a pressing force of the first friction brake; and wherein the stationary friction discs and the first rotation friction discs are placed between the brake support wall and the end wall, and the brake support wall and the end wall receive the reaction force to the pressing of the brake.

10. The final reduction gear unit adapted to be used with a vehicle according to claim 6, wherein second rotation friction discs and axle-side friction discs of the second friction brake are placed between a side wall of the differential case and the end wall with interposition of a thrust bearing, and the side wall and the end wall receive the reaction force to the pressing of the brake.

11. The final reduction gear unit adapted to be used with a vehicle according to claim 7, wherein the second rotation friction discs and the axle-side friction discs are placed between a side wall of the differential case and the end wall with interposition of a thrust bearing, and the side wall and the end wall receive the reaction force to the pressing of the brake.

12. The final reduction gear it adapted to be used with a vehicle according to claim 6, comprising:

a brake operation device for braking the vehicle by activating the first friction brake and the second friction brake; and a diff-lock operation device for putting the differential mechanism into a lock state by activating the second friction brake alone.

13. The final reduction gear unit adapted to be used with a vehicle according to claim 7, comprising:

a brake operation device for braking the vehicle by activating the first friction brake and the second friction brake; and a diff-lock operation device for putting the differential mechanism into a lock state by activating the second friction brake alone.

14. The final reduction gear unit adapted to be used with a vehicle according to claim 6, wherein slip torque of the second friction brake is set to half the braking force of the first friction brake.

15. The final reduction gear unit adapted to be used with a vehicle according to claim 7, wherein slip torque of the second friction brake is set to half the braking force of the first friction brake.

16. A vehicle final reduction gear unit comprising:

a prime mover generating a drive force;

a drive shaft transmitting a drive force from the prime mover;

a small reduction gear coupled to the drive shaft for rotation;

a large reduction gear meshing with the small reduction gear for rotation;

a differential mechanism transmitting a drive force from the large reduction gear to left and right axles;

a differential case housing the differential mechanism; and a final-reduction-gear case provided closer to a vehicle body, and housing the small reduction gear, the large reduction gear, the differential mechanism and the differential case;

wherein the vehicle final reduction gear unit further includes:

a first friction brake occupying an area between the final-reduction-gear case which is a stationary body and the differential case which is a rotating body for applying a pressing force in an axial direction to generate a frictional force in order to put a brake on the differential case; and a second friction brake occupying an area between the differential case and the right axle, for applying a pressing force in the axial direction to generate a frictional force in order to use a rotational difference to put the differential mechanism into a lock state;

wherein the second friction brake is placed within the radius of the first friction brake, and further comprising:

a brake operation device for braking the vehicle by activating the first friction brake and the second friction brake; and a diff-lock operation device for putting the differential mechanism into a lock state by activating the second friction brake alone.

17. The final reduction gear unit adapted to be used with a vehicle according to claim 16, wherein the first friction brake further comprises:

a cylinder-shaped first friction brake supporter that is mounted to the differential case and extends from one of left and right ends of the differential case in the vehicle-transverse direction;

a plurality of stationary friction discs that are spline-fitted into a cylinder-shaped inner peripheral surface of the final-reduction-gear case and able to move in an axial direction; and a plurality of first rotation friction discs that are spline-fitted into a cylinder-shaped outer peripheral surface of the first friction brake supporter and arranged alternately with the stationary friction discs; and the second friction brake comprises:

a plurality of second rotation friction discs that are spline-fitted into a cylinder-shaped inner peripheral surface of the first friction brake supporter;

a collar that is spline-fitted into the right axle; and a plurality of axle-side friction discs that are spline-fitted into a cylinder-shaped outer peripheral surface of the collar and arranged alternately with the second rotation friction discs.

18. The final reduction gear unit adapted to be used with a vehicle according to claim 17, wherein the final-reduction-gear case comprises:

a cylinder-shaped central case member having left and right opening ends in the vehicle-transverse direction;

a left case member placed on the left side of the central case member and having an end wall; and wherein the right case member is placed on the right side of the central case member and having an end wall;

the central case member is tightly placed between the left and right case members, is integratedly fastened to the left and right case members, and has a brake support wall provided integrally therewith, the brake support wall protruding inward in the radial direction to receive a pressing force of the first friction brake; and the stationary friction discs and the first rotation friction discs of the first friction brake are placed between the brake support wall and the end wall, and the brake support wall and the end wall receive the reaction force to the pressing of the brake.

* * * * *